(12) United States Patent
Xie et al.

(10) Patent No.: US 10,619,843 B2
(45) Date of Patent: Apr. 14, 2020

(54) HEAT DISSIPATION FAN STRUCTURE CAPABLE OF SHOWING PATTERN OF LIGHT

(71) Applicant: DONGGUAN CITY HANSHUO PLASTIC CO., LTD., Guangdong Province (CN)

(72) Inventors: Hong-Hua Xie, Guangdong Province (CN); Xiao-Jian Yang, Guangxi Province (CN); Hai-Yin Yu, Guangxi Province (CN)

(73) Assignee: DONGGUAN CITY HANSHUO PLASTIC CO., LTD., Dong Guan (CN)

(*) Notice: Subject to any disclaimer, the term of this patent is extended or adjusted under 35 U.S.C. 154(b) by 121 days.

(21) Appl. No.: 16/043,148

(22) Filed: Jul. 23, 2018

(65) Prior Publication Data
US 2019/0032912 A1    Jan. 31, 2019

(30) Foreign Application Priority Data

Jul. 28, 2017   (TW) .............................. 106211119 U

(51) Int. Cl.
*F21V 33/00* (2006.01)
*F21V 23/00* (2015.01)
*G06F 1/20* (2006.01)

(52) U.S. Cl.
CPC ........ *F21V 33/0096* (2013.01); *F21V 23/005* (2013.01); *G06F 1/20* (2013.01)

(58) Field of Classification Search
CPC ....... F21V 33/0096; F21V 23/005; G06F 1/20
See application file for complete search history.

(56) References Cited

U.S. PATENT DOCUMENTS

2006/0120063 A1*  6/2006 Lai ........................ F04D 25/06
                                                                362/96

* cited by examiner

*Primary Examiner* — Karabi Guharay
*Assistant Examiner* — Fatima N Farokhrooz
(74) *Attorney, Agent, or Firm* — Bruce Stone LLP; Joseph A. Bruce

(57) ABSTRACT

A heat dissipation fan structure capable of showing a pattern of light includes a circuit board, a light guide plate, a light-permeable element, and a vane assembly sequentially connected together. The circuit board is provided with a light emission unit. The vane assembly has a light-permeable wall made of a light-permeable material. The light emitted by the light emission unit is evenly diffused by the light guide plate, passes through the light-permeable element, and is rendered into a specific pattern (e.g., a decorative design and/or characters) by the light-permeable portion of the light-permeable element, wherein the light-permeable portion is shaped according to user needs. The light-permeable material of the light-permeable wall of the vane assembly allows the decorative design and/or characters of light to be seen externally. The heat dissipation fan structure, therefore, can show a pattern of light in addition to dissipating heat.

6 Claims, 2 Drawing Sheets

HEAT DISSIPATION FAN STRUCTURE CAPABLE OF SHOWING PATTERN OF LIGHT

BACKGROUND OF THE INVENTION

1. Technical Field

The present invention relates to a fan structure and more particularly to a heat dissipation fan structure capable of showing a pattern of light.

2. Description of Related Art

Heat dissipation fans are used extensively and are required in almost every product that needs heat dissipation, particularly electronic products that generate heat easily. Most of the conventional heat dissipation fans, however, serve heat dissipation purposes only and are not intended to be decorative or visually pleasing. When such a fan is used in way that leaves it exposed to view, the look of the product where the fan is installed may be compromised as a result. It is therefore highly desirable to provide a heat dissipation fan structure that is permeable to light and capable of showing a pattern of light to esthetically enhance not only the fan structure itself, but also the product using it in an externally visible manner.

BRIEF SUMMARY OF THE INVENTION

The present invention provides a heat dissipation fan structure capable of showing a pattern of light. The primary objective of the invention is to enable the fan structure to not only dissipate heat but also show a pattern of light.

To achieve the above objective, the invention provides a heat dissipation fan structure that can show a pattern of light. The heat dissipation fan structure includes a housing, a first circuit board, a motor, a second circuit board, a light guide plate, a light-permeable element, and a vane assembly.

The housing has a receiving space.

The first circuit board is provided in the receiving space.

The motor is coupled to the first circuit board, is in control communication with the first circuit board, and has a mounting portion at one end.

The second circuit board is provided with a light emission unit, is electrically connected to the first circuit board, is configured to drive the light emission unit to emit light, and has a first through hole, through which the mounting portion is inserted.

The light guide plate has a second through hole, through which the mounting portion is also inserted. The light guide plate is provided on the side of the second circuit board that faces diametrically away from the motor. The light guide plate faces the light emission unit in order to evenly diffuse the light emitted by the light emission unit.

The light-permeable element has a third through hole, through which the mounting portion is also inserted. The light-permeable element is provided on the side of the light guide plate that faces diametrically away from the second circuit board. The light-permeable element has a light-blocking portion and a light-permeable portion. The light-blocking portion is made of a material impermeable to light while the light-permeable portion allows passage of light.

The vane assembly has a main housing portion and a plurality of vanes. The main housing portion has a light-permeable wall and an annular wall. The light-permeable wall and the annular wall form a space therebetween. The vanes are provided along the circumference of the annular wall. The light-permeable wall is made of a light-permeable material. The light guide plate and the light-permeable element are provided in the space. The side of the light-permeable element that faces diametrically away from the light guide plate faces the light-permeable wall. The vane assembly is in power connection with the motor.

According to the above, the light emitted by the light emission unit can be evenly diffused by the light guide plate and then propagate through the light-permeable element, or more particularly through the light-permeable portion thereof, which can be designed according to user needs in order for the light passing through the light-permeable portion to show a specific pattern, e.g., a decorative design and/or characters. The decorative design and/or characters of light are visible through the light-permeable material of the light-permeable wall of the vane assembly such that the heat dissipation fan structure can show a pattern of light as well as dissipate heat.

DETAILED DESCRIPTION OF THE INVENTION

Figure 1:
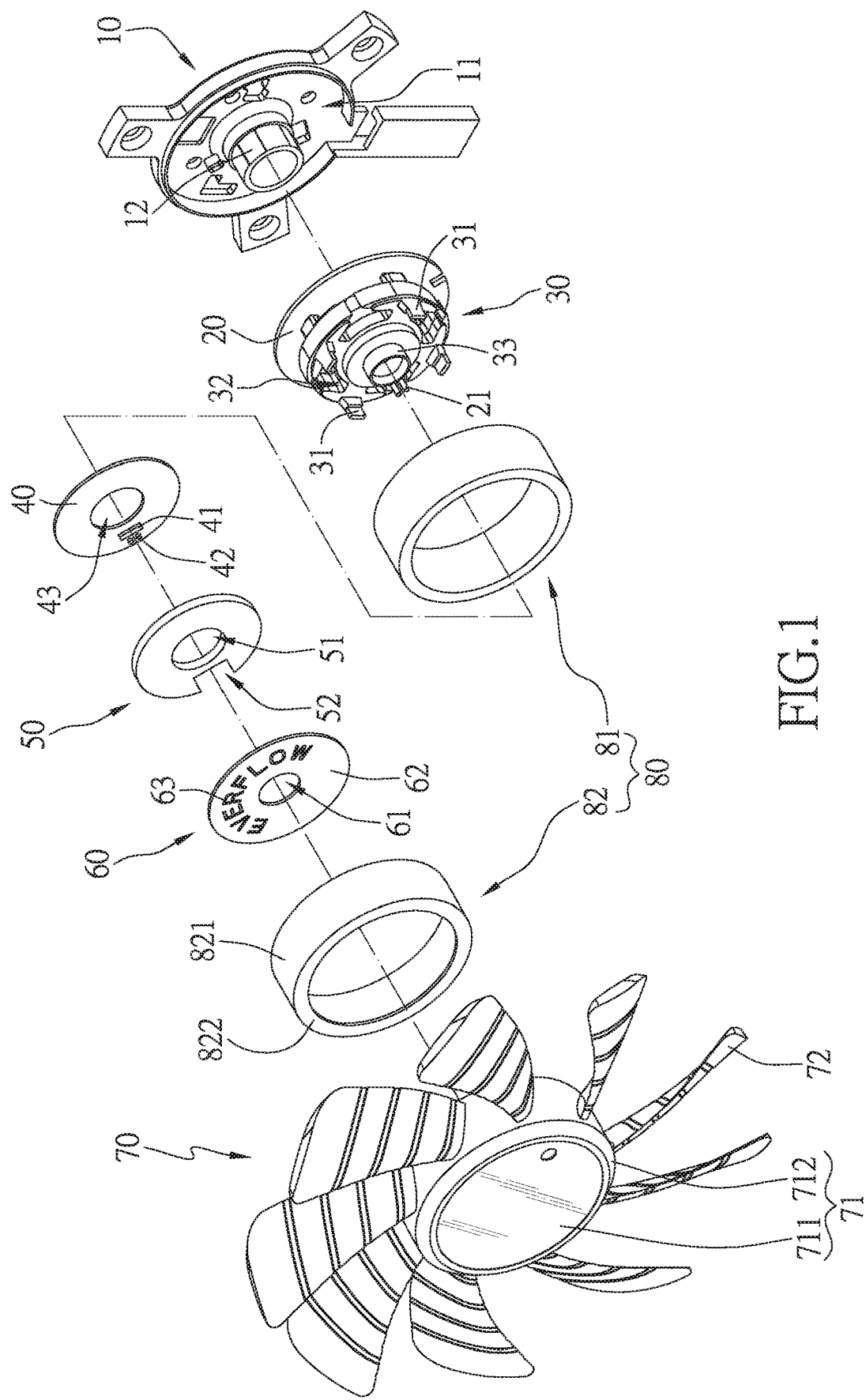
FIG. 1 is an exploded perspective view of the heat dissipation fan structure capable of showing a pattern of light according to an embodiment of the present invention.
Figure 2:
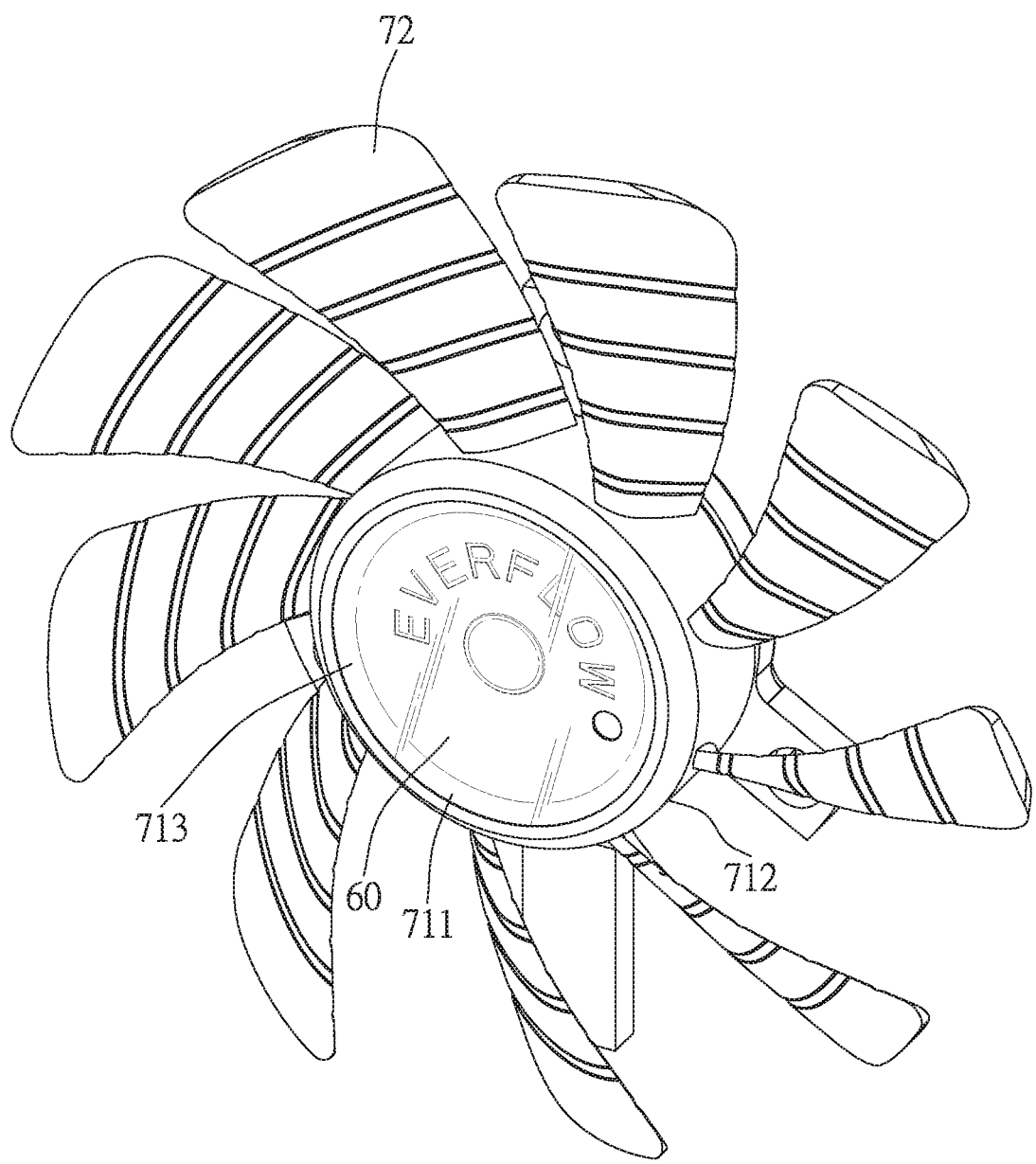
FIG. 2 is an assembled perspective view of the heat dissipation fan structure in FIG. 1.

The present invention provides a heat dissipation fan structure capable of showing a pattern of light. Referring to FIG. 1 and FIG. 2, the heat dissipation fan structure according to an embodiment of the invention includes a housing 10, a first circuit board 20, a motor 30, a second circuit board 40, a light guide plate 50, a light-permeable element 60, and a vane assembly 70.

The housing 10 has a receiving space 11 and a securing projection 12 in the receiving space 11.

The first circuit board 20 is provided with a conducting wire 21 for making electrical connection. The first circuit board 20 is provided in the receiving space 11 and is mounted around the securing projection 12.

The motor 30 is coupled to the first circuit board 20 and is in control communication with the first circuit board 20. The motor 30 is provided with a plurality of securing ribs 31 at one end. The securing ribs 31 surround and thereby define a mounting space 32. The end of the motor 30 that is provided with the securing ribs 31 further has a mounting portion 33.

The second circuit board 40 is provided with a light emission unit 41 and a receiving portion 42. The conducting wire 21 is electrically connected to the receiving portion 42. The second circuit board 40 is configured to drive the light emission unit 41 to emit light. The second circuit board 40 has a first through hole 43, and the mounting portion 33 is inserted through the first through hole 43. The second circuit board 40 is provided in the mounting space 32.

The light guide plate 50 has a second through hole 51, and the mounting portion 33 is also inserted through the second through hole 51. The light guide plate 50 is provided in the mounting space 32 and is provided on the side of the second circuit board 40 that faces diametrically away from the motor 30. The light guide plate 50 further has a light-guiding space 52. The light emission unit 41 is located in the light-guiding space 52 in order for the light guide plate 50 to evenly diffuse the light emitted by the light emission unit 41.

The light-permeable element 60 has a third through hole 61, and the mounting portion 33 is inserted through the third through hole 61, too. The light-permeable element 60 is provided in the mounting space 32 and is provided on the side of the light guide plate 50 that faces diametrically away from the second circuit board 40. The light-permeable element 60 further has a light-blocking portion 62 and a light-permeable portion 63. The light-blocking portion 62 is made of a material that is impermeable to light. The light-permeable portion 63, on the other hand, is made of a light-permeable material or is hollow so that the diffused light generated by the light guide plate 50 can propagate through the light-permeable portion 63. The light-permeable portion 63 can be shaped into a decorative design, characters, and so on according to user needs.

The vane assembly 70 has a main housing portion 71 and a plurality of vanes 72. The main housing portion 71 has a light-permeable wall 711 and an annular wall 712. The light-permeable wall 711 and the annular wall 712 form a space 713 therebetween. The vanes 72 are provided along the circumference of the annular wall 712. The light-permeable wall 711 is made of a light-permeable material. Both the light guide plate 50 and the light-permeable element 60 are provided in the space 713. The side of the light-permeable element 60 that faces diametrically away from the light guide plate 50 faces the light-permeable wall 711. The vane assembly 70 is in power connection with the motor 30.

Preferably, the heat dissipation fan structure further includes a securing unit 80. The securing unit 80 includes a securing ring 81 and a limit stop ring 82. The securing ring 81 is a hollow cylinder and is mounted around the motor 30, the second circuit board 40, the light guide plate 50, and the light-permeable element 60 in order to secure the motor 30, the second circuit board 40, the light guide plate 50, and the light-permeable element 60. The limit stop ring 82 has a ring portion 821 and a stop portion 822 located at one end of the ring portion 821. The limit stop ring 82 is mounted around the securing ring 81 such that the securing ring 81 abuts against the stop portion 822.

The configuration and features of the heat dissipation fan structure capable of showing a pattern of light have been disclosed above. The following paragraph details the effects of the foregoing configuration and features.

The heat dissipation fan structure capable of showing a pattern of light is so designed that the light emitted by the light emission unit 41 can be evenly diffused by the light guide plate 50 and then pass through the light-permeable element 60, whose light-permeable portion 63 can be shaped as needed to render the light passing through the light-permeable portion 63 into a specific pattern (e.g., a decorative design and/or characters) visible through the light-permeable material of the light-permeable wall 711 of the vane assembly 70. Thus, the heat dissipation fan structure not only can dissipate heat but also can show a pattern of light.

What is claimed is:

1. A heat dissipation fan structure capable of showing a pattern of light, comprising:
   a housing having a receiving space;
   a first circuit board provided in the receiving space;
   a motor coupled to and in control communication with the first circuit board, wherein the motor has an end provided with a mounting portion;
   a second circuit board provided with a light emission unit and electrically connected to the first circuit board, wherein the second circuit board is configured for driving the light emission unit to emit light and has a first through hole, and the mounting portion is inserted through the first through hole;
   a light guide plate having a second through hole, with the mounting portion inserted also through the second through hole, wherein the light guide plate is provided on a side of the second circuit board that faces diametrically away from the motor, and the light guide plate faces the light emission unit in order to evenly diffuse the light emitted by the light emission unit;
   a light-permeable element having a third through hole, with the mounting portion inserted also through the third through hole, wherein the light-permeable element is provided on a side of the light guide plate that faces diametrically away from the second circuit board, the light-permeable element has a light-blocking portion and a light-permeable portion, the light-blocking portion is made of a material impermeable to light, and the light-permeable portion is permeable to light; and
   a vane assembly having a main housing portion and a plurality of vanes, wherein the main housing portion has a light-permeable wall and an annular wall, the light-permeable wall and the annular wall form a space therebetween, the vanes are provided along a circumference of the annular wall, the light-permeable wall is made of a light-permeable material, the light guide plate and the light-permeable element are provided in the space, the light-permeable element has a side facing the light-permeable wall but facing diametrically away from the light guide plate, and the vane assembly is in power connection with the motor.

2. The heat dissipation fan structure capable of showing the pattern of light as recited in claim 1, wherein the first circuit board is provided with a conducting wire, the second circuit board has a receiving portion, and the conducting wire is electrically connected to the receiving portion.

3. The heat dissipation fan structure capable of showing the pattern of light as recited in claim 1, wherein the light guide plate has a light-guiding space, and the light emission unit is located in the light-guiding space.

4. The heat dissipation fan structure capable of showing the pattern of light as recited in claim 1, wherein the end of the motor is further provided with a plurality of securing ribs; the securing ribs surround and thereby define a mounting space; and the second circuit board, the light guide plate, and the light-permeable element are provided in the mounting space.

5. The heat dissipation fan structure capable of showing the pattern of light as recited in claim 1, further comprising a securing unit, wherein the securing unit comprises a securing ring and a limit stop ring; the securing ring is a hollow cylinder and is mounted around the motor, the second circuit board, the light guide plate, and the light-permeable element; the limit stop ring has a ring portion and a stop portion at an end of the ring portion; and the limit stop ring is mounted around the securing ring such that the securing ring abuts against the stop portion.

6. The heat dissipation fan structure capable of showing the pattern of light as recited in claim 1, wherein the receiving space is provided therein with a securing projection, and the first circuit board is mounted around the securing projection.

\* \* \* \* \*